Dec. 11, 1923.  
M. W. H. CROSSKILL  
FLOUR SIFTING UTENSIL  
Filed Oct. 12, 1921  
1,476,693
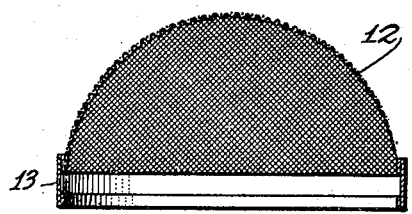
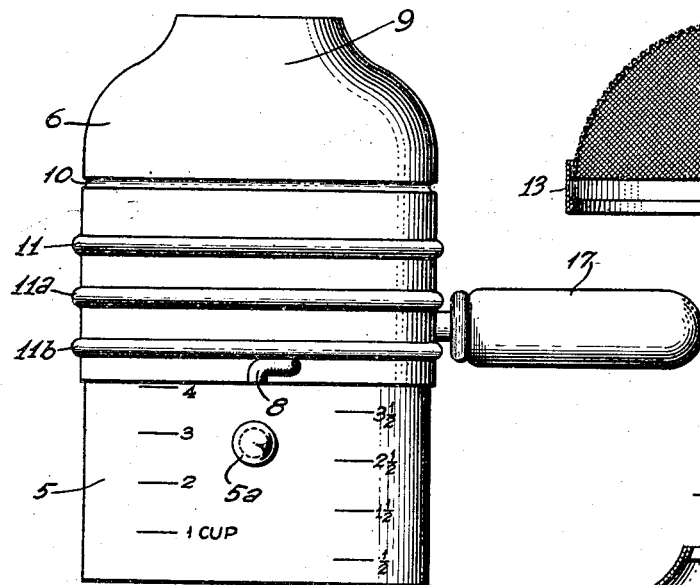
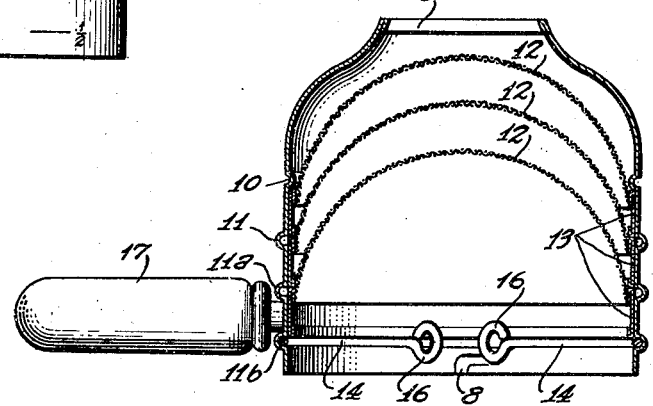
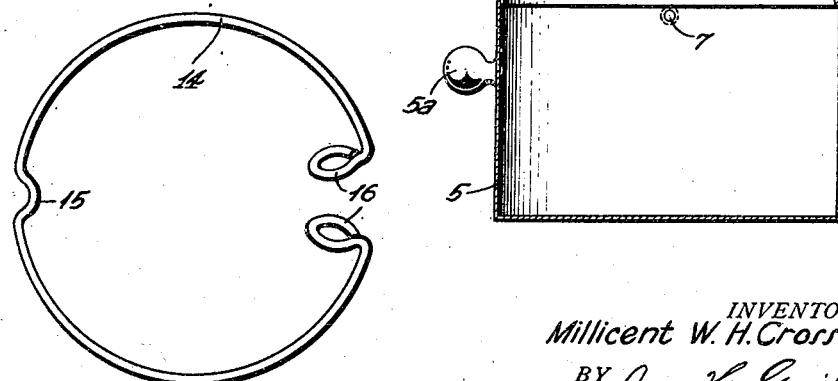
INVENTOR.
Millicent W. H. Crosskill
BY Jas. H. Griffin
ATTORNEYS.

Patented Dec. 11, 1923.

1,476,693

UNITED STATES PATENT OFFICE.

MILLICENT W. H. CROSSKILL, OF NEW YORK, N. Y.

FLOUR-SIFTING UTENSIL.

Application filed October 12, 1921. Serial No. 507,294.

*To all whom it may concern:*

Be it known that I, MILLICENT W. H. CROSSKILL, a subject of the King of Great Britain, residing in New York city, borough of Bronx, in the county of Bronx and State of New York, have invented a certain new and useful Flour-Sifting Utensil, of which the following is a specification.

This invention is a sifter adapted to be used by cooks for the sifting of flour.

It is well recognized by skilled cooks and students of domestic economy that in order to properly condition flour for baking purposes, it should be sifted not less than three times, the aim of these repeated siftings being, mainly, to produce flour in a light and fluffy condition, due more or less to the resulting aeration of the flour through the finely dividing up of the flour particles. When flour is thus sifted, it not only produces lighter doughs, but results in superior baked products.

In carrying out the triple sifting referred to, it is, the common practice to sift flour through an ordinary sieve and thereafter resift it twice through the same sieve. This operation is open, however, to several disadvantages, among which may be mentioned that the flour becomes more or less packed incident to the several handlings occasioned by the operation, and, moreover, the operations are more or less messy incident to the transfer of the flour from one receptacle to another.

It has heretofore been suggested to utilize a unitary utensil embodying a plurality of sieves, but the structures of the same were not only complicated and expensive to manufacture, but were more or less unsanitary and generally inefficient for their intended purposes. As a result, they have not found their way to the market or gone into use.

The present invention overcomes the disadvantages adverted to and others, in that it embodies a simple structure, economical to manufacture and highly efficient for its intended purposes. Moreover, it is thoroughly sanitary and is so constructed that the parts thereof may be readily dismantled for efficient cleansing and thereafter quickly reassembled.

Recipes in modern cook books usually specify a cup as the standard for determining the quantity of flour to be used. It is the customary practice of many housewives in measuring flour to fill the cup with flour, level off the top thereof, and thereafter dump the flour from the cup into the flour sieve. This operation is usually accompanied by a spilling of the flour either during its introduction into the cup, the leveling off of the cup or in the dumping of the flour from the cup into the sieve. Moreover, it is necessary with the sieves now employed to hold the sieve over the mixing dish or bowl while dumping the flour thereinto, as, in the present sieves, the flour is delivered directly upon the mesh of the sieve and at least a portion thereof immediately passes through the sieve.

In order to obviate the disadvantages just adverted to and others, the sieve of the present invention preferably embodies a casing formed in two parts or sections, one section of which constitutes a measuring receptacle, which is adapted to partake of an upright position, while flour is delivered into said receptacle and measured therein. The said two sections of the sieve may thereafter be assembled to enclose the flour in a substantially closed chamber, the top of which is formed by the sieves or screens through which the flour is adapted to be passed, whereupon the utensil may be inverted to deliver the flour on to the sieves through which said flour is passed in succession by bodily vibrating or agitating the utensil.

In practice, the measuring receptacle is preferably graduated and the graduations thereof are so calculated as to measure standard quantities of the sifted flour, in contradistinction to the unsifted flour, it being well known that the sifting of flour increases its bulk or volume.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative only, and not as defining the limits of the invention.

Figure 1 is a side elevation of a flour sifter embodying the present invention.

Figure 2 is a central section of the sifter showing the two sections of the casing separated from one another.

Figure 3 is a central section of one of the sections employed in the sifter; and, Figure 4 shows a clamping ring employed to demountably maintain the sections in position.

The flour sifting utensil of this invention is provided with a two-part casing. The section 5 is in the form of a measuring cup or receptacle, substantially cylindrical in cross section and having a closed bottom. It may be provided with a suitable handle 5ª and is preferably graduated as shown in Figure 1 to facilitate the determination of measured quantities, such for example as cups and fractions of cups. However, the graduations may be otherwise designated to correspond to a different unit of measure within the cup. The section 6 of the casing is cylindrical in cross section for the greater portion of its length and one end of this section 6 is adapted to telescope over the top of the measuring cup and the sections secured in this assembled relation by means of a bayonet joint, a threaded connection or any other suitable securing means. For the purpose of illustration, however, I have shown the measuring cup as provided with stamped up exterior projections 7, adapted to cooperate with bayonet shaped channels 8 formed in the interior of the section 6 and near the lower edge thereof, so that when the two sections of the cup are brought into telescoping relation, the projection 7 of the section 5 may enter the bayonet joint depressions 8 of the section 6, whereupon relative rotation between said sections will lock the parts together.

The opposite end of the section 6 is preferably contracted or substantially frusto conical to provide a tapering discharge mouth 9, and the edge of the metal forming this mouth is preferably turned back or curled so as to obviate the presence of a sharp edge and to further reinforce the discharge mouth against bending or loosing its shape.

The section 6 is provided adjacent its discharge mouth with an interior bead 10 and at spaced distance from this interior bead are three circumferentially disposed interior annular channels 11, 11ª, and 11ᵇ, the channel 11ᵇ being adjacent the end of the section 6, which cooperates with the section 5.

The section 6 is adapted to house a plurality of screens or sieve elements, which in the preferred form are as shown in Figure 3 of the drawings. These screen elements may be flat or of other desired contour, but, for the purpose of illustration, I have shown them as semi-spherical. Thus, the sieve element shown in Figure 3 embodies a semi-spherical or dome shaped screen 12 of wire mesh, the margin of which is provided with an annular binding 13 in the form of a metallic ring substantially equal in width to the distance between the interior bead 10 and the next adjacent annular channel 11. The ring 13 is in exterior diameter substantially equal to the interior diameter of the section 6, so that three elements of the character shown in Figure 3 may be introduced into the section 6 in nested relation to one another after the manner shown in Figure 2, wherein the contiguous edges of the successive bindings 13 are illustrated as in engagement with one another, while the uppermost binding is seated on the bead 10. The sieve elements may be held in this nested and assembled relation by means of a spring ring 14, shown in Figure 4 and adapted to be sprung into the channel 11ᵇ wherein it will serve to hold the bindings 13 in engagement with one another and the uppermost bindings in engagement with the bead 10.

The spring ring 14 is preferably provided intermediate its ends with an off set portion 15 to increase its resiliency and preclude any chance of the lowermost binding 13 from slipping over the spring ring, while the opposite ends of the spring ring are provided with inturned curled ends 16 which form finger pieces adapted to be grasped and pressed together for the purpose of collapsing the rings to facilitate its positioning in or removal from the channel 11ᵇ. The channels 11 and 11ª are provided, so that if, for any reason or other, only one sieve element is desired, the spring ring may be associated with the channel 11 and the other two sieve elements omitted, while if two sieve elements are desired, they may be held in place by associating the spring ring with the channel 11ª.

When it is desired to use the utensil of the present invention, the section 5 is removed from the section 6 and employed to measure the amount of flour to be sifted. Such flour is deposited within the measuring receptacle 5 and the exact quantity desired may be determined by means of the graduations thereon. After the flour has been measured, the section 6 is telescoped over the section 5 and said sections are locked together by means of the bayonet joint elements 7 and 8, whereupon the assembled sections are picked up by a handle 17 associated with the section 6 and of any suitable construction, and the utensil is inverted over a mixing dish, so as to deliver the contents of the measuring receptacle on to the uppermost sieve screen 12. The utensil is then vibrated or agitated by imparting such movement to the handle 17, which is rigid therewith, with the result that the flour passes through the three screens in succession and form the last screen passes directly through the delivery mouth 9 into the mixing bowl.

After the flour has been sifted in the manner described, the sieve is returned to upright position and may be set down so as to rest upon the flat bottom of the measuring receptacle 5. Any screenings which have been removed by the lowermost screen will fall back into the measuring receptacle and may be removed by removing said screen from the section 5.

In practice, all of the screens 12 are preferably of the same mesh and the mesh is made sufficiently fine so that the first screen may remove all undesirable matter and screenings will not be intercepted between successive screens. A marked advantage of the construction described is that after flour is once deposited in the measuring receptacle, it is entirely enclosed and is fed directly to the screens and thence directly into the mixing bowl. The flour is passed from one screen to the next in succession, so that the triple sifting operation is accomplished without interposed handling of the flour and, accordingly, it is finely divided and rendered fluffy and light when delivered into the mixing bowl.

The utensil is moreover highly sanitary, since the screen elements may be readily removed from the section 6 for the purpose of cleansing or washing the parts. In the sifters now employed, more or less flour clings to the screen or lodges in crevices after the sifting operation, so that when the sifter is subsequently set on the table this flour shakes off and falls on the table. With the present utensil, however, all such flour falls into the measuring receptacle and the table is kept clean thereof. I have found in practice that the contracted or frusto conical mouth is of considerable advantage, particularly when sifting flour into relatively small mixing bowls, since in the absence of such construction, great care must be exercised lest the flour be sifted over the edge onto the table.

In graduating the measuring cup 5, these graduations show the measure quantity of the sifted flour. I am aware that when flour is sifted it increases in bulk and in graduating the measuring receptacle, these graduations are so worked out that they will give measured quantities of sifted flour. This greatly expedites and facilitates the work of the cook as it is not necessary to sift the flour and thereafter measure it. I find, in practice, that a cup of sifted flour is greater by two or three tablespoons full than the same quantity of flour before sifting. This proportion of increase, however, is taken care of automatically by the utensil of this invention.

In the foregoing detail description, I have set forth the preferred embodiment of the present invention. It will be understood, however, that the structure described may be modified in details, such for example as by the substitution of equivalents without departing from the spirit of this invention, the scope of which is to be considered as broadly novel as is commensurate with the appended claims.

Having thus fully described the invention, what I claim as new and desire to secure by Letters Patent is:

1. A flour sifting utensil embodying a substantially cylindrical casing, one end of which is contracted in a substantially funnel shape forming a tapering discharge mouth, said casing being provided interiorly with an annular bead and also an annular channel spaced from the bead, a plurality of nested semiglobular screens positioned within the casing with one screen seated on the annular bead and successive screens seated on the next preceding screen, and a split ring associated with the annular channel for maintaining the screens in position.

2. A flour sifting utensil embodying a substantially cylindrical casing, one end of which is contracted in a substantially funnel shape forming a tapering discharge mouth, said casing being provided interiorly with an annular bead adjacent the discharge mouth and also an annular channel longitudinally of the casing from the bead, a plurality of nested semiglobular screens positioned within the casing with one screen seated on the annular bead and successive screens seated on the next preceding screen, and a split ring associated with the annular channel for maintaining the screens in position, in combination with a measuring receptacle adapted to contain flour to be sifted, said measuring receptacle being substantially cylindrical with a closed bottom and open top and proportioned to telescope into the base of the casing, whereby flour may be measured in the measuring receptacle and the measuring receptacle thereafter telescoped into the casing so that the implement may thereupon be bodily inverted to deliver the flour from the measuring receptacle on to the sieves through which it is adapted to successively pass to be discharged from the discharge mouth.

3. A flour sifting utensil embodying a substantially cylindrical casing, one end of which is contracted in a substantially funnel shape forming a tapering discharge mouth, said casing being provided interiorly with an annular bead adjacent the discharge mouth and also an annular channel longitudinally of the casing from the bead, a plurality of nested semi-globular screens positioned within the casing with one screen seated on the annular bead and successive screens seated on the next preceding screen, and a split ring associated with the annular channel for maintaining the screens in position, in combination with a measuring receptacle adapted to contain flour to be sifted, said measuring receptacle being substantially cylindrical with a closed bottom and open top and proportioned to telescope into the base of the casing, said measuring receptacle being graduated to show in what quantities the flour contained in said receptacle will be after it is sifted, whereby flour may be measured in the measuring receptacle and the measuring receptacle thereafter telescoped into the casing so that the implement may thereupon be bodily inverted to deliver the flour from the measuring receptacle on to the sieves through which it is adapted to successively pass to be discharged from the discharge mouth.

In testimony whereof I have signed the foregoing specification.

MILLICENT W. H. CROSSKILL.